(12) United States Patent  (10) Patent No.: US 9,285,558 B2
Gross et al.  (45) Date of Patent: Mar. 15, 2016

(54) SYSTEM FOR MOUNTING A PLURALITY OF FIBER OPTIC CASSETTES TO A HIGH DENSITY CASSETTE SHELF

(71) Applicant: All Systems Broadband, Inc., Livermore, CA (US)

(72) Inventors: Donald James Gross, Raleigh, NC (US); Timothy W. Dexter, Raleigh, NC (US); David J. Braga, Raleigh, NC (US)

(73) Assignee: All Systems Broadband, Inc., Livermore, CA (US)

( * ) Notice: Subject to any disclaimer, the term of this patent is extended or adjusted under 35 U.S.C. 154(b) by 218 days.

(21) Appl. No.: 14/065,464

(22) Filed: Oct. 29, 2013

(65) Prior Publication Data

US 2015/0098683 A1 Apr. 9, 2015

Related U.S. Application Data

(60) Provisional application No. 61/887,805, filed on Oct. 7, 2013.

(51) Int. Cl.
G02B 6/00 (2006.01)
G02B 6/44 (2006.01)
G02B 6/38 (2006.01)

(52) U.S. Cl.
CPC ............ *G02B 6/4455* (2013.01); *G02B 6/3897* (2013.01); *G02B 6/4452* (2013.01)

(58) Field of Classification Search
CPC .. G02B 6/4255; G02B 6/4452; G02B 6/4453; G02B 6/4455
See application file for complete search history.

(56) References Cited

U.S. PATENT DOCUMENTS

2011/0103760 A1* 5/2011 Cote et al. ..................... 385/135

* cited by examiner

*Primary Examiner* — Uyen Chau N Le
*Assistant Examiner* — Chad Smith
(74) *Attorney, Agent, or Firm* — Murphy, Bilak & Homiller, PLLC

(57) ABSTRACT

A system for mounting a plurality of fiber optic cassettes includes an enclosure and angle-iron-shaped elongated members that are affixed within the enclosure and vertically spaced apart. The elongated members include shelf fastener perforations disposed at regular intervals along a mounting surface and arranged to horizontally and vertically align with fastener perforations of one of the fiber optic cassettes. The system further includes a plurality of adapter brackets. Each of the adapter brackets include first and second generally planar sections spaced apart from one another and a third section joining the first and second sections. The third section includes a bracket fastener perforation. First, second and third stabilization features protrude from the first and second planar sections and are collectively arranged to secure the adapter bracket to one of the elongated members and to simultaneously allow the adapter bracket to move in a horizontal direction without substantial resistance.

16 Claims, 11 Drawing Sheets

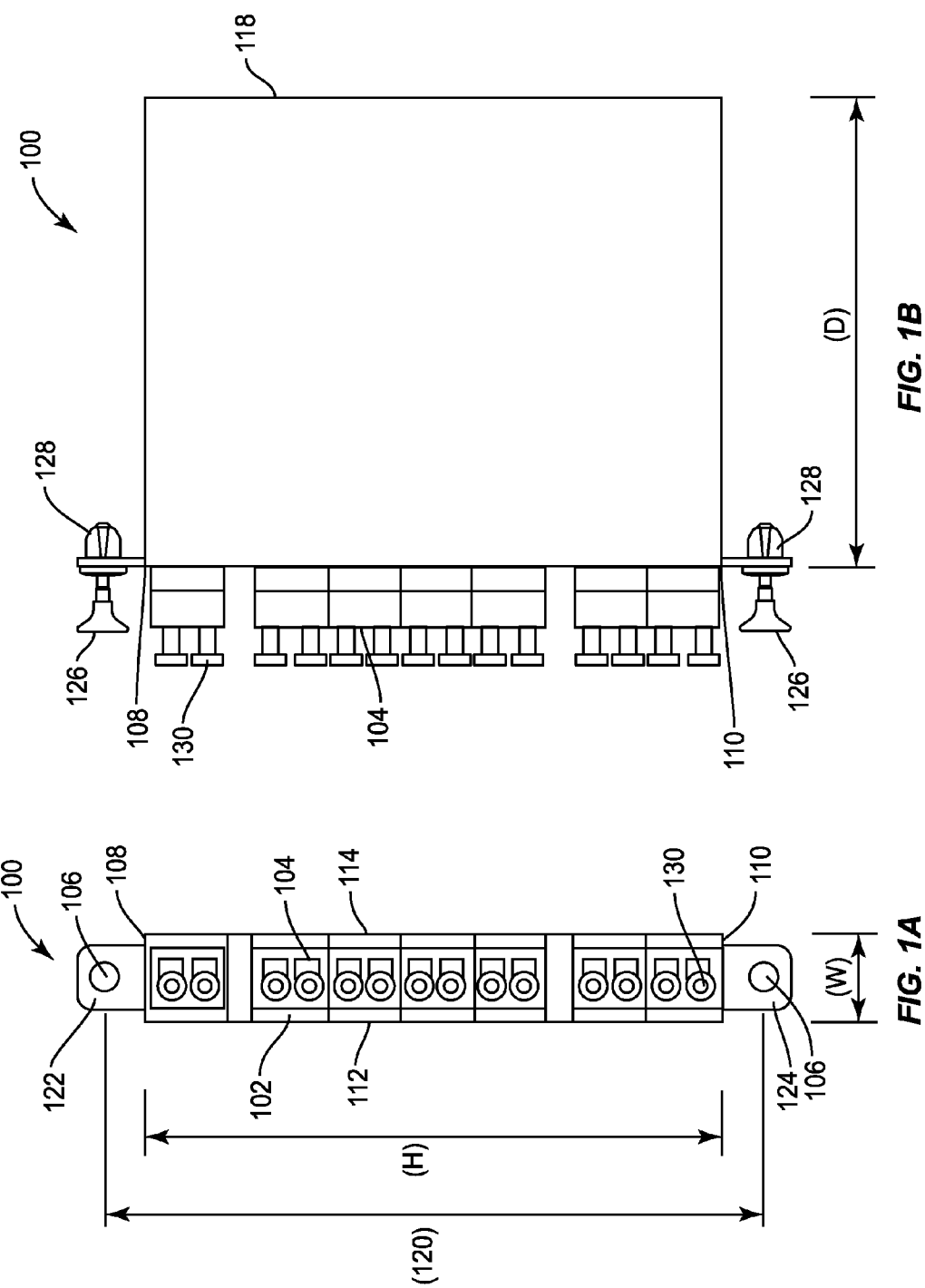

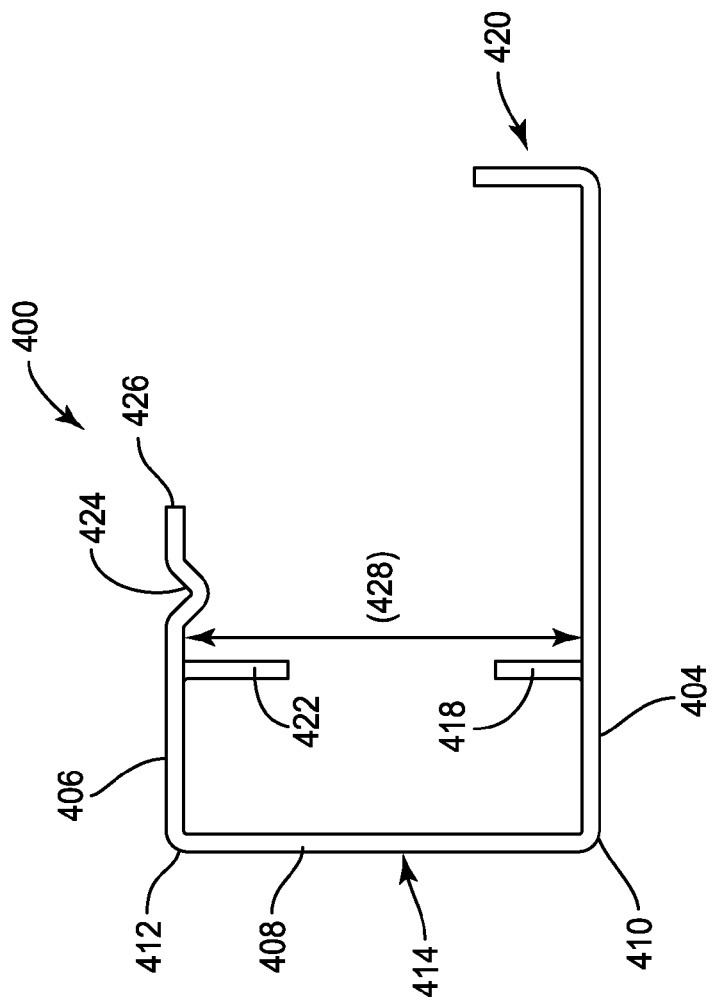
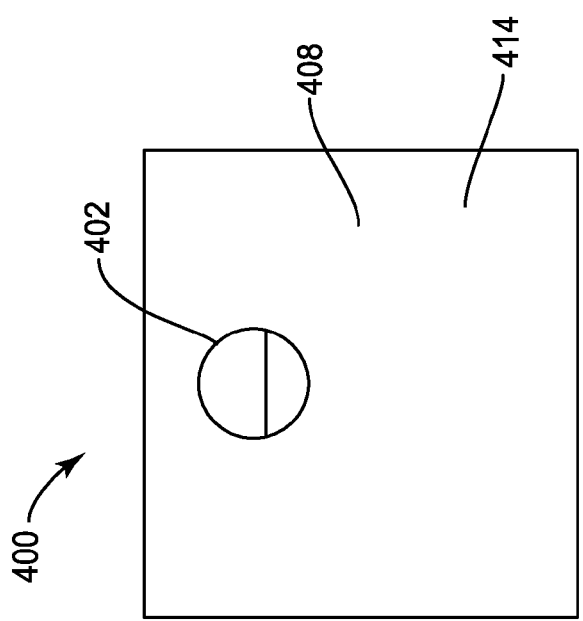
FIG. 4B
FIG. 4A

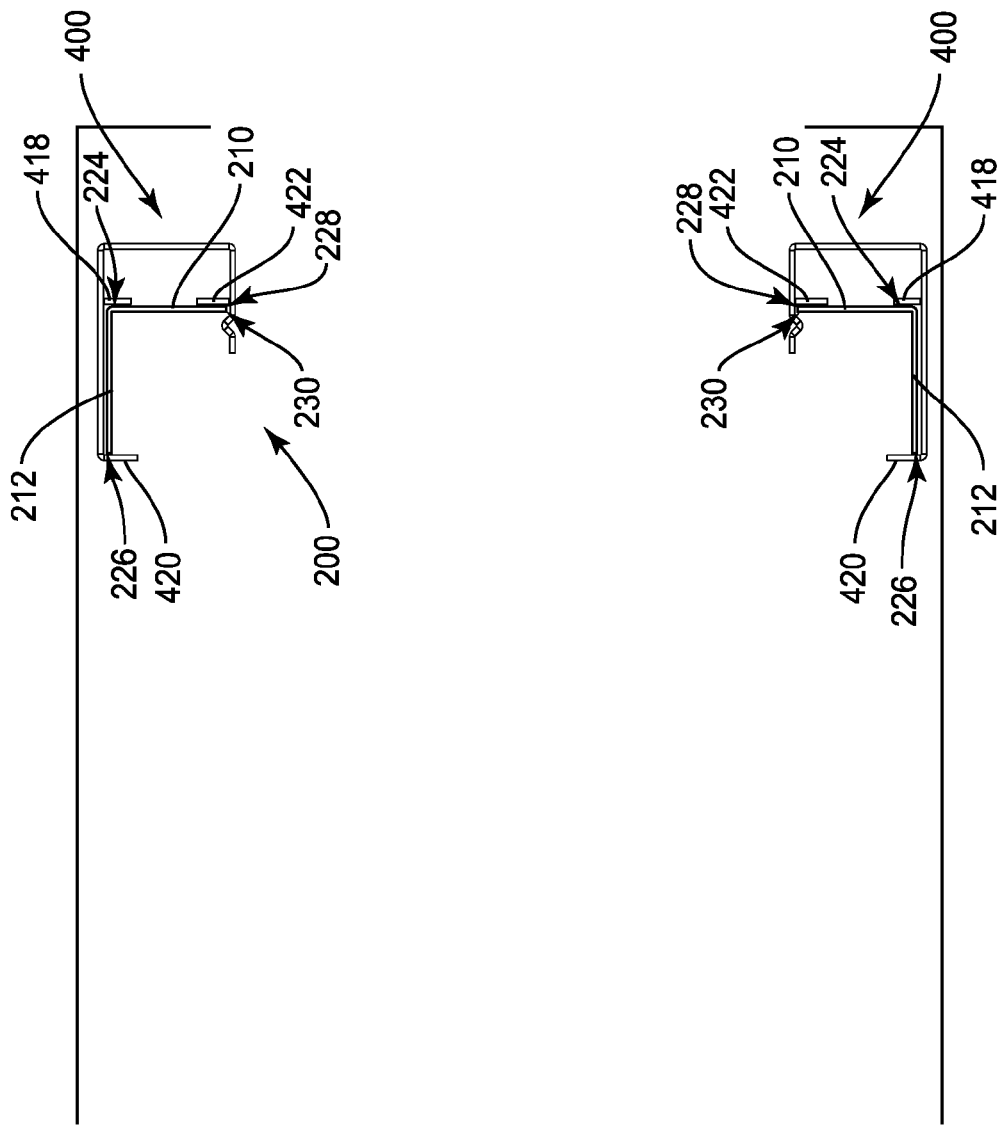

SYSTEM FOR MOUNTING A PLURALITY OF FIBER OPTIC CASSETTES TO A HIGH DENSITY CASSETTE SHELF

TECHNICAL FIELD

The present invention generally relates to fiber optical networks, and particularly relates to systems for mounting passive fiber optic cassettes used to provide optimized density connectivity.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth over distance with lower losses and maintenance.

Delivery of fiber optic communication services from a service provider to a customer is effectuated by interfacing service provider cabling with customer cabling at one or more termination points. A termination point includes individual terminations, i.e., splices of fiber optic cable, which may be contained and organized in an enclosure. In some instances, the space available for a termination point may be limited. For example, a termination point may be limited to the space within relatively small cabinets, data centers and storage area networks. This space limitation is particularly problematic if a customer seeks to upgrade his or her fiber optic network and the existing termination points are at or near maximum capacity. In this instance, there may be little or no available space to expand the termination point. Complete redesign and redistribution of the fiber optic network is typically not a viable alternative, as this option involves substantial expense.

Fiber optic cassettes may be implemented in a fiber optic network to maximize the space efficiency of termination points and thus mitigate the need for new space. Fiber optic cassettes are typically passive devices that accommodate a plurality of fiber optic cables. Fiber optic cassettes typically include a vertical array of receptacles that are complementary to a standardized endpoint structure of fiber optic cables. These receptacles provide plug-and-socket functionality between the cassettes and fiber optic cables that allows an installer to easily effectuate multiple terminations without having to manually splice the fibers. Moreover, the terminations are efficiently arranged in a vertical array. The cassettes may include additional features that allow installers to make efficient use of space, such as power or wavelength splitting of the signals transmitted on the fiber optical cabling.

Fiber optic cassettes are mounted to structures that accommodate one or more fiber optic cassettes in an organized fashion. The dimensions of fiber optic cassettes may vary. As technology progresses, fiber optic cassettes tend to reduce in size, particularly in width. In some instances, a customer may wish to mount older, larger fiber optic cassettes and newer, smaller fiber optic cassettes together in a single structure at a termination point. Depending on the compatibility of the structure used to mount the fiber optic cassettes, this may not be possible, or may only be possible with a significant amount of unutilized space.

In view of the foregoing, there is a need for improvement.

SUMMARY

According to an embodiment, a system for mounting a plurality of fiber optic cassettes is provided. The system includes an enclosure dimensioned to contain the plurality of fiber optic cassettes in a horizontal array. First and second angle-iron-shaped elongated members are affixed within the enclosure. Each of the first and second elongated members includes a first elongated section having a substantially flat mounting surface with an array of shelf fastener perforations. Each of the shelf fastener perforations are disposed at regular intervals along the mounting surface and are dimensioned to receive a cassette fastener for affixing one of the fiber optic cassettes against the flat surface. A second elongated section of the first and second elongated members is perpendicular to the first elongated section. The first and second elongated members are arranged so that fiber optic cassettes may be secured to the first and second elongated members, using corresponding shelf fastener perforations. The system further includes a plurality of adapter brackets. Each of the adapter brackets include first and second generally planar sections spaced apart from one another. A third section of the adapter bracket joins the first and second sections at one end of each of the first and second sections. The third section includes a bracket fastener perforation dimensioned to receive a cassette fastener for affixing a fiber optic cassettes against a first substantially flat mounting surface of the third section. Each of the adapter brackets further include first, second and third stabilization features and a locking feature. The first and second stabilization features protrude from the first planar section; the third stabilization feature and the locking feature protrude from the second planar section. The first, second and third stabilization features and the locking feature are collectively arranged to secure the adapter bracket to one of the first and second elongated members and to simultaneously allow the adapter bracket to move horizontally with respect to the first elongated section without substantial resistance.

According to another embodiment, an adapter bracket for mounting a fiber optic cassette to an elongated angle-iron shaped mounting structure is disclosed. The adapter bracket includes first and second generally planar sections spaced apart from one another. A third section joins the first and second sections at one end of each of the first and second sections. The third section includes a fastener perforation dimensioned to receive a cassette fastener for affixing the fiber optic cassette against a first substantially flat surface of the third section. The adapter bracket further includes first, second and third stabilization features and a locking feature. The first and second stabilization features protrude from the first planar section; the third stabilization feature and the locking feature protrude from the second planar section. The first second and third stabilization features and the locking feature are collectively arranged to engage corners of an angle-iron shaped mounting structure, such that the adapter bracket is prevented from rotating but allowed to move horizontally without substantial resistance, with respect to the mounting structure.

BRIEF DESCRIPTION OF THE DRAWINGS

FIG. 1A depicts a front-view perspective of an exemplary fiber optic cassette that may be used in a system for mounting a plurality of fiber optic cassettes, according to an embodiment.

FIG. 1B depicts a side-view perspective of the exemplary fiber optic cassette of FIG. 1A, according to an embodiment.

FIGS. 4A, 4B, and 4C depict front, side and diagonal views, respectively, of an adapter bracket that may be secured to elongated angle-iron shaped members of a fiber optic cassette shelf, according to an embodiment.

FIG. 5 depicts a side-view perspective of a pair of adapter brackets secured to two vertically spaced apart elongated angle-iron shaped members of a fiber optic cassette shelf, according to an embodiment.

DETAILED DESCRIPTION

Figure 2A:
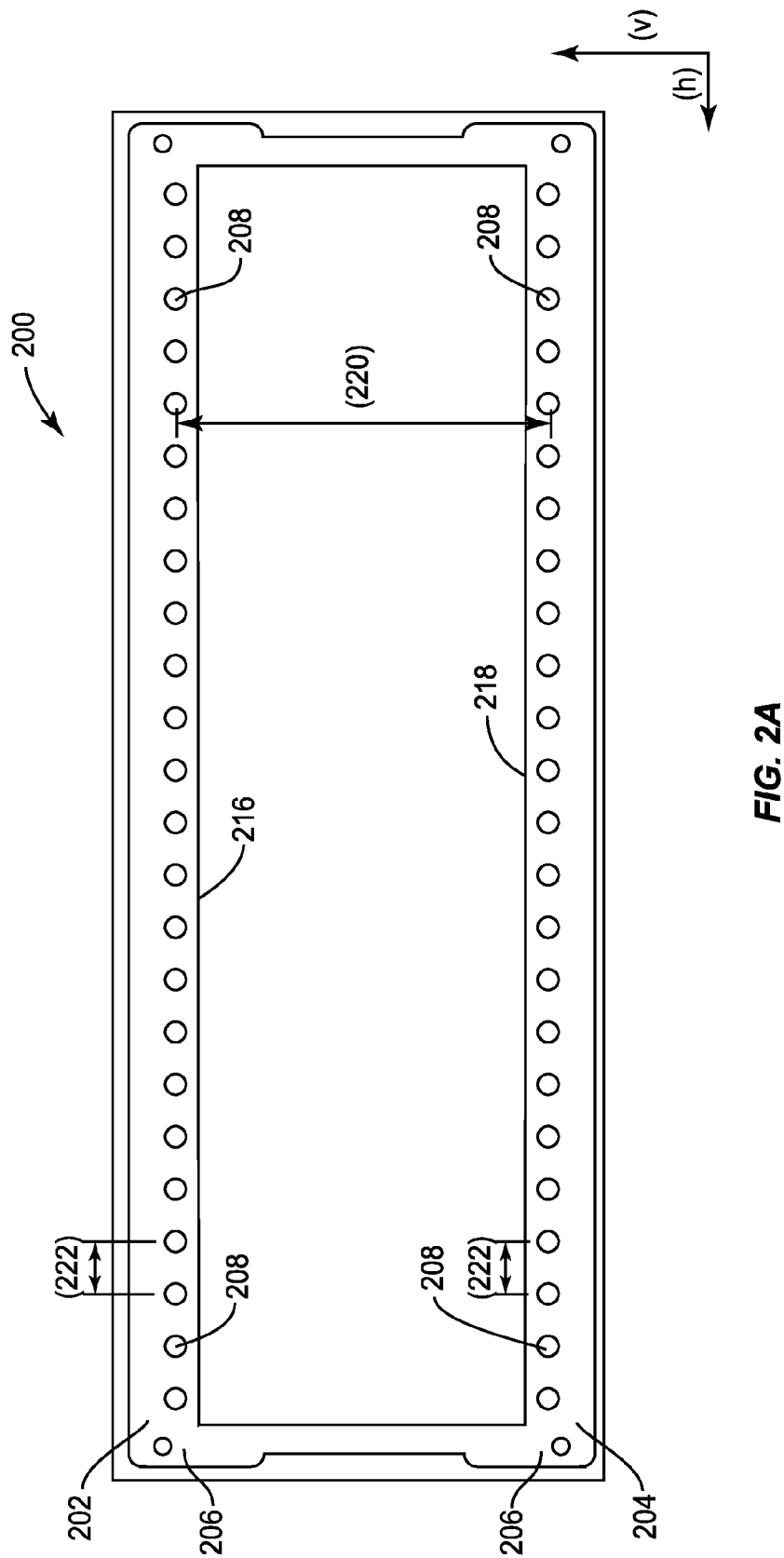
FIG. 2A depicts a front-view perspective of a fiber optic cassette shelf that may be used to mount a plurality of fiber optic cassettes, according to an embodiment.

FIGS. 1A-1B depict a fiber optic cassette 100. Fiber optic cassette 100 is an exemplary fiber optic cassette that may be used in a fiber optic network to provide terminations of multiple fiber optical cables. The cassette 100 has a front side 102 that includes a vertical array of ports 104. The ports 104 accommodate and mechanically couple with fiber optic cables having compatible connector types, such as LC (Lucent Connector) of SC (Subscriber Connector) ports. As shown in the figures, the ports 104 are protected by dust caps 130. Dust caps 130 are typically provided in the ports 104 to protect the ports from dust, moisture, etc. Dust caps 130 are removed from the cassette 100 prior to effectuating a connection with a compatible fiber optic cable (i.e. providing a termination) so that ports 104 are accessible. The number and dimensions of the ports 104 may vary, depending on the application or particular user requirements.

FIG. 1A indicates a height (H) of the cassette 100 that is measured from a first end 108 to a second end 110. A width (W) of the cassette 100 is measured from a first sidewall 112 to a second sidewall 114. A depth (D) of the cassette 100 is measured from the front side 102 to a rear side 118.

A first mounting tab 122 extends vertically away from the first end 108 and includes one cassette fastener perforation 106. A second mounting tab 124 extends vertically away from the second end 110 and includes one cassette fastener perforation 106. A vertical center-to-center spacing 120 of the two cassette fastener perforations 106 is measured from the center of the cassette fastener perforation 106 disposed in the first mounting tab 122 to the center of the opposite cassette fastener perforations 106 disposed in the second mounting tab 124.

Cassette fasteners 126 and receptacles 128 are shown in FIG. 1B. The combination of fastener 126 and receptacle 128 provide an assembly that is used to secure the cassette 100 to a structure having fastener perforations that are complementary to the receptacle 128. According to an embodiment, cassette fasteners 126 and receptacles 128 are a push-pin assembly in which the cassette fastener 126 is a plunger and receptacle 128 is a grommet. In this embodiment, a flange of the receptacle 128 is situated in the cassette fastener perforation 106 such that a front side of the receptacle 128 is in front of one of the first or second mounting tabs 122, 124 and such that a rear side of the receptacle 128 behind one of the respective mounting tabs 122, 124. A cassette 100 is mounted to a mounting structure having corresponding fastener perforations by inserting the rear side of the receptacle 128 through the corresponding fastener perforations and pushing the cassette fastener 126 into the receptacle 128 such that the receptacle 128 expands and provides a counter-acting stabilization force on the mounting structure. Alternatively, the fasteners 126 may also be screws and the receptacles 128 may be nuts. Still further, the cassette fastener perforation 106 may be threaded to receive a screw, so that nuts are not necessary.

Figure 2B:
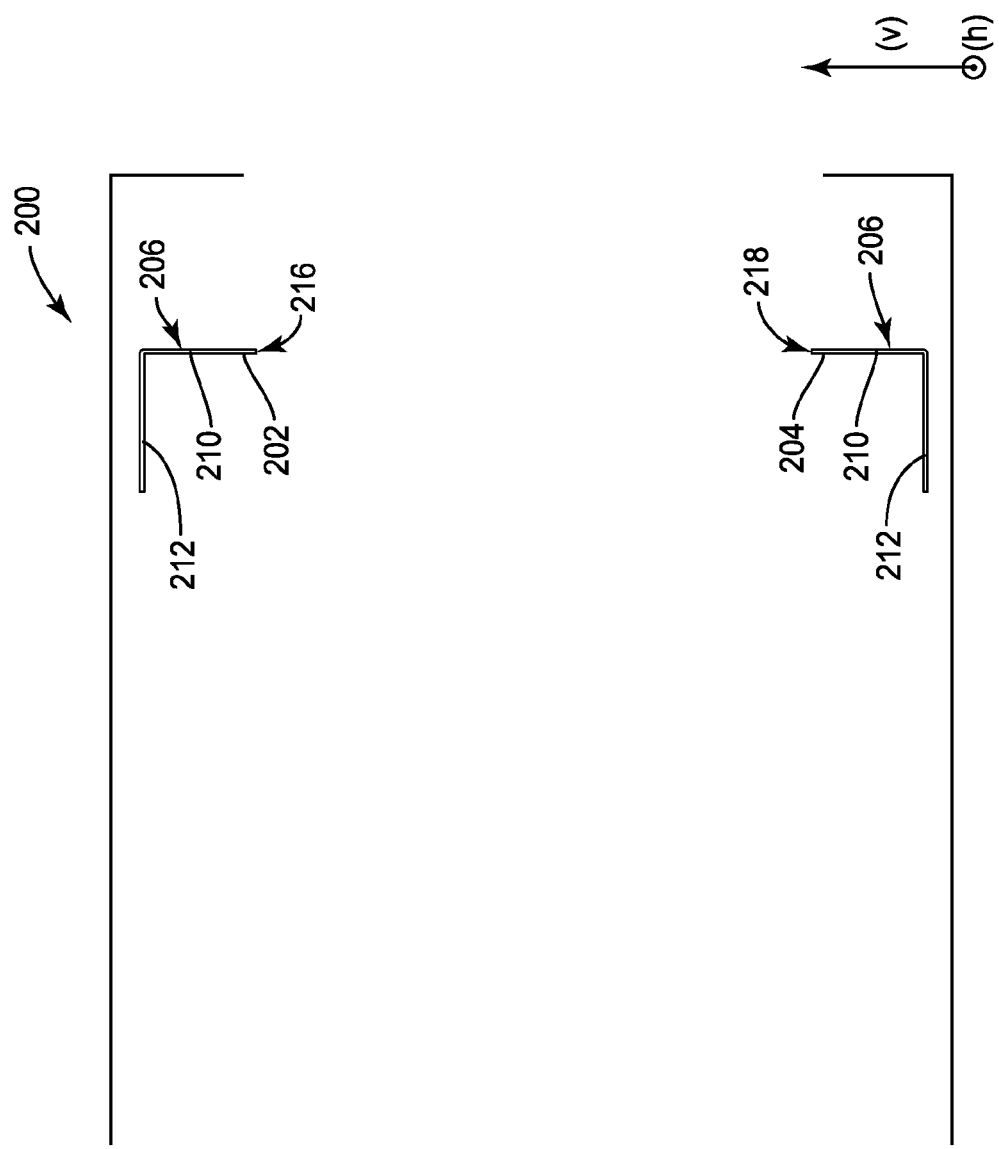
FIG. 2B depicts a side-view perspective of the fiber optic cassette shelf of FIG. 2A, according to an embodiment.

FIGS. 2A and 2B depict a fiber optic cassette shelf 200. Cassette shelf 200 is an exemplary mounting structure used to mount a plurality of fiber optic cassettes 100. FIG. 2A is a front-view perspective and FIG. 2B is a cross-sectional perspective. Elongated members 202, 204 are affixed within the fiber optic cassette shelf 200. According to an embodiment, other members are arranged between each of the elongated members 202, 204 at ends to form a continuous frame structure within the fiber optic cassette shelf 200. Each of the elongated members 202, 204 have a substantially flat mounting surface 206 with an array of shelf fastener perforations 208 disposed at regular intervals along the mounting surface 206. The shelf fastener perforations 208 are dimensioned to receive the cassette fasteners 126 so that an installer may secure one of the cassettes 100 to the fiber optic cassette shelf 200 using the cassette fasteners 126 and receptacles 128, as described above.

A horizontal direction (h) as shown in the figures refers to a direction that is parallel to the flat mounting surface 206 and parallel to a line running through centers of respective shelf faster perforations 208 on one of the elongated members 202, 204. A vertical direction (v) as depicted refers to a direction that is parallel to the flat mounting surface 206 and perpendicular to the horizontal direction (h). The elongated members 202, 204 and the shelf fastener perforations 208 disposed on the elongated members 202, 204 are arranged so that a plurality of fiber optic cassettes 100 may be mounted to the elongated members 202, 204 in a horizontal array. In a horizontal array, the fiber optic cassettes 100 are horizontally spaced apart from one another such that the first and second sidewalls 112, 114 of respective fiber optic cassettes 100 are substantially parallel to the vertical direction (v).

As shown in FIG. 2B, each of the elongated members 202, 204 are angle-iron-shaped. In other words, a first elongated section 210 faces towards an opening of the cassette shelf 200 substantially parallel to the vertical direction and a second elongated section 212 is perpendicular to the first elongated section 210. Second elongated sections 212 of the elongated members 202, 204 face towards the top and bottom of the cassette shelf 200, respectively. The first elongated section 210 includes the mounting surface 206 and the array of shelf fastener perforations 208.

The first and second elongated members 202, 204 are vertically spaced apart such that a distance between ends 216, 218 corresponds to or is substantially close to the height (H) of a given fiber optic cassette 100. This spacing allows a fiber optic cassette 100 to be positioned between the first and elongated members 202, 204 such that the first and second sidewalls 112, 114 are substantially parallel to the vertical direction and such that the first and second mounting tabs 122, 124 hang over the mounting surfaces 206 of the first and elongated members 202, 204. Ideally, the first and second elongated members 202, 204 are vertically spaced apart to allow one of the cassettes 100 that is inserted between the first and elongated members 202, 204 and oriented as described above to be moved in the horizontal direction (h) without substantial resistance. The vertical spacing of the first and second elongated members 202, 204 may be greater than the height (H) of a given fiber optic cassette 100, provided that the first and second mounting tabs 122, 124 may be arranged such that cassette fastener perforations 106 substantially align with shelf fastener perforations.

The shelf fastener perforations 208 are arranged so that vertically spaced-apart pairs of shelf fastener perforations 208 on each of the first and second elongated members 202, 204 may be vertically and horizontally aligned with a pair of cassette fastener perforations 106 on one of the cassettes 100 that is inserted between the first and second elongated members 202. Thus, the elongated members 202, 204 are arranged such that vertically spaced apart pairs of shelf fastener perforation 208 on each of the first and second elongated members 202, 204 are horizontally aligned with one another. Further, the vertically spaced apart pairs of shelf fastener perforations 208 have a vertical center-to-center spacing that 220 that substantially corresponds to the vertical center-to-center spacing 120 of the cassette fastener perforations 106. In addition, the shelf fastener perforations 208 on each of the first and second elongated members 202, 204 have a horizontal center-to-center spacing 222 that is, at a minimum, equal to the width (W) of a particular fiber optic cassette 100. Tailoring the center-to-center spacing 222 to the width of a particular fiber optic cassette 100 allows for optimum efficiency, as the fiber optic cassettes 100 may be mounted in a horizontal array with no wasted space between the cassettes. Alternatively, the center-to-center spacing 222 may be slightly larger than the width (W) of a particular fiber optic cassette 100 so that additional marginal horizontal space exists between the fiber optic cassettes 100 to allow for easier mounting and/or variation in the width (W) of the fiber optic cassette.

Figure 3A:
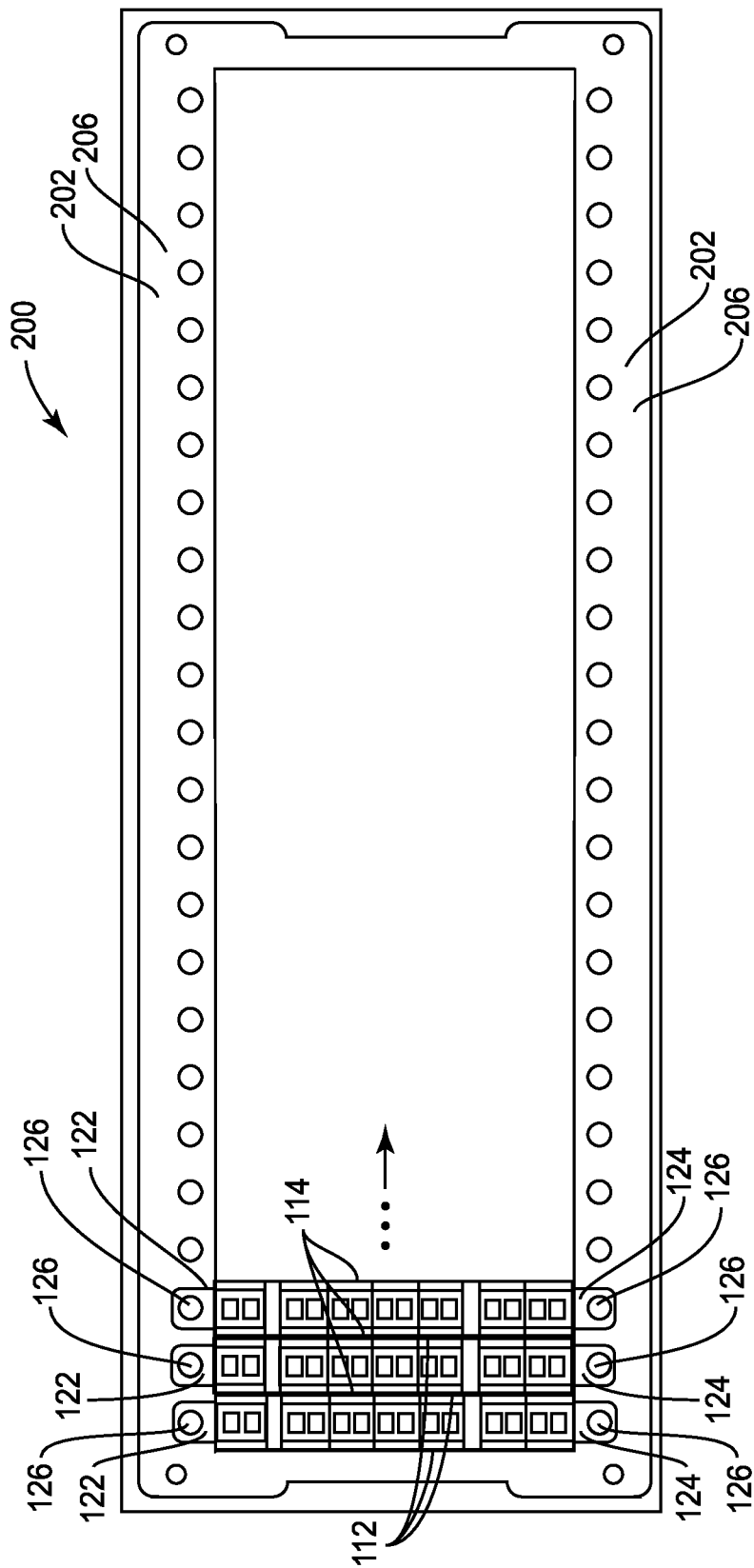
FIG. 3A depicts a front-view perspective of a fiber optic cassette shelf having a horizontal array of fiber optic cassettes mounted to the fiber optic cassette shelf, according to an embodiment.
Figure 3B:
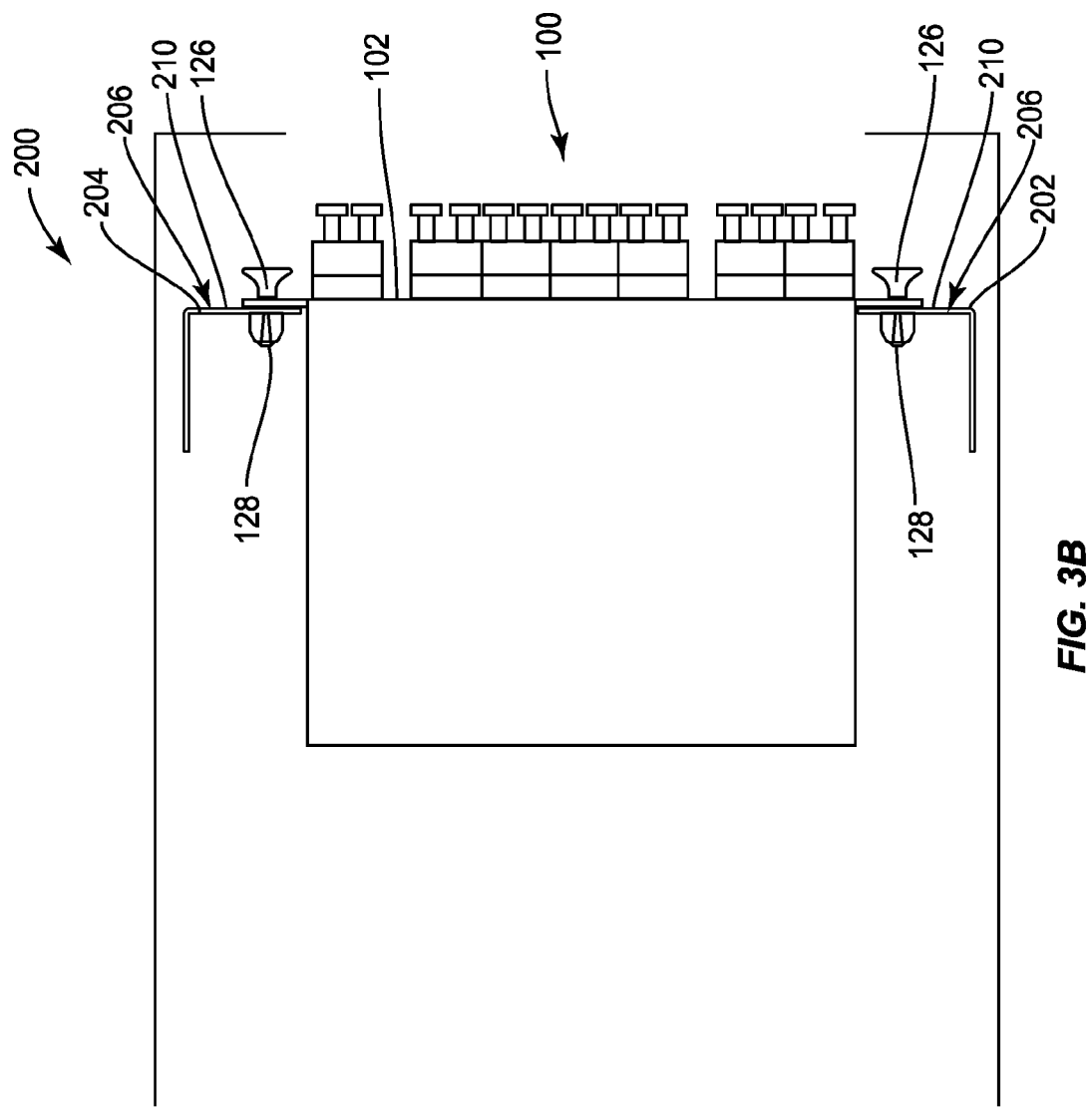
FIG. 3B depicts a side-view perspective of the fiber optic cassette shelf and cassette arrangement of FIG. 3A, according to an embodiment.

FIGS. 3A-3B depict a front-view and a side-view of the of the fiber optic cassette shelf 200 containing a plurality of fiber optic cassettes 100 mounted in a horizontal array. As shown in FIG. 3A, each of the fiber optic cassettes 100 are mounted to the fiber optic cassette shelf 200 using two of the cassette fasteners 126. One assembly of the cassette fastener 126 and receptacle 128 is arranged in the cassette fastener perforation 106 disposed in the top mounting tab 122 of a cassette 100 and in one of the shelf fastener perforations 208 on the first elongated member 202; an additional assembly of the cassette fastener 126 and receptacle 128 is arranged in the cassette fastener perforation 106 disposed in the bottom mounting tab 124 of the cassette 100 and in one of the shelf fastener perforations 208 on the second elongated member 204. The cassette fasteners 126 and receptacles 128 are used to secure the cassette 100 in a manner as described above such that the cassette 100 is substantially prohibited from movement.

As shown in FIG. 3B, when the fiber optic cassettes 100 are secured to the cassette shelf 200, the front side 102 of the fiber optic cassettes 100 is substantially parallel to the mounting surfaces 206 of the first and second elongated members 202, 204. The cassette fasteners 126 are engaged in the receptacles 128 such that the receptacles are expanded and provide a counteracting force on the first and second elongated members 202, 204.

The fiber optic cassettes 100 depicted in FIGS. 3A-3B are identically dimensioned. The vertical center-to-center spacing 220 of the shelf fastener perforations 208 substantially corresponds to the vertical center-to-center spacing 120 each of the cassettes 100. The horizontal center-to center spacing 222 of the shelf fastener perforations 208 is slightly larger than the width (W) of the cassettes 100. This arrangement of the shelf fastener perforations 208 allows for the mounting of a plurality of identically dimensioned cassettes 100 in a horizontal array in an efficient, yet user-friendly manner. However, the arrangement of the shelf fastener perforations 208 is permanent and may not allow for the mounting of differently dimensioned cassettes 100 or may only accommodate the differently dimensioned cassettes 100 in an inefficient manner.

Although the width (W) of the cassettes 100 shown in FIG. 3A is identical, cassettes 100 having different dimensions are often used in a single instillation. Generally, connector style of the ports 104 determines the width (W) of the cassettes 100. In addition, so-called "double-wide" or "triple-wide cassettes" that have two or three vertical rows of ports 104 and hence are wider than the cassettes 100 shown, which have a single vertical row of ports 104, are commonly used. A user may wish to install two sets of cassettes 100 in which one set has a different connector style and hence a different the width (W) than a second set of cassettes 100. For instance, a user may wish to install one set of cassettes 100 having LC connector ports and a width of approximately 16.2 mm (millimeters) and a second set of cassettes 100 having SC connector ports that is approximately 29 mm. In this example, the cassettes 100 have the same vertical center-to-center spacing 120. If an installer is using a cassette shelf 200 having horizontal center-to-center 222 spacing and vertical center-to-center spacing 220 that is tailored to the dimensions of the narrower cassettes in a similar manner as described, installation of both the narrower and wider cassettes 100 within the shelf is possible. This is due to a vertical center-to-center spacing 220 that is common to both types of cassettes 100. However, efficiency is less than optimal. Because the width (W) of the wider cassettes 100 is slightly more than double the width of the narrower cassettes 100, the wider cassettes 100 can only be mounted to every third pair of shelf fastener perforations 208 on each of the first and second elongated members 202, 204. In other words, when one of the wider cassettes 100 is mounted a vertically spaced apart pair of shelf fastener perforations 208, the immediately adjacent pairs of shelf fastener perforations 208 are unavailable because the wider cassettes 100 occupy too much space. Thus, a cassette 100 that occupies slightly more than twice the horizontal space of a narrower cassette 100 requires three times the horizontal space in the cassette shelf 200.

Figure 4C:
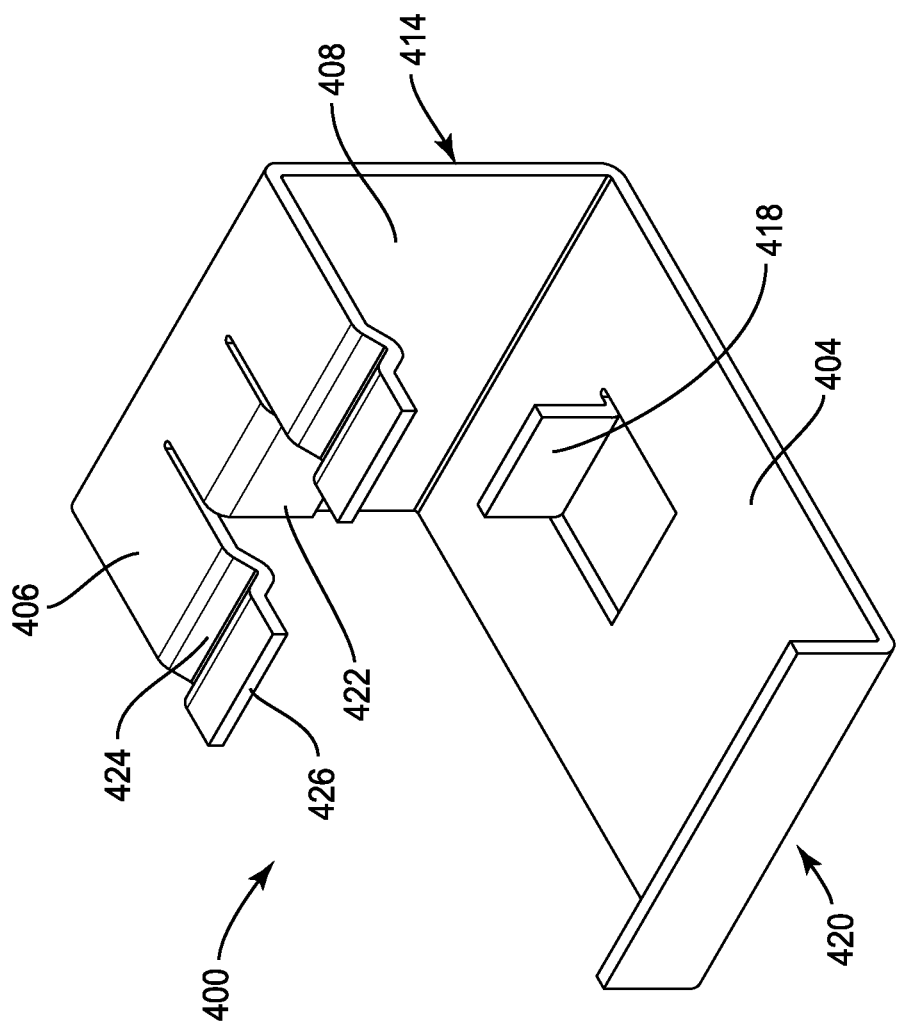

FIGS. 4A-4C depict an adapter bracket 400 that is configured to be mounted to one of the first and second elongated members 202, 204 of the cassette shelf 200. FIG. 4A is a front-view of the adapter bracket 400, FIG. 4B is a side-view and FIG. 4C is a diagonal view.

A pair of adapter brackets 400 may be secured to the first and second elongated members 202, 204 to provide a vertically spaced apart pair of bracket fastener perforations 402.

The bracket fastener perforations 402 are dimensioned similar to the shelf fastener perforations 208 previously discussed. A fiber optic cassette 100 may be secured to the adapter brackets 400 and consequently to the first and second elongated members 202, 204 via the vertically spaced apart pair of bracket fastener perforations 402 using cassette fasteners 126 and receptacles 128 in a similar manner as discussed above with reference to the shelf fastener perforations 208.

Advantageously, the adapter brackets 400 may be arranged to provide a vertically spaced apart pair of bracket fastener perforations 402 in different locations than the permanently arranged shelf fastener perforations 208. Thus, the permanent horizontal center-to-center spacing 222 of the shelf fastener perforations 208 may be supplanted by an infinitely adjustable horizontal center-to-center spacing provided by horizontally adjacent adapter brackets 400 mounted to one of the first and second elongated members 202, 204. Alternatively, the vertical center-to-center spacing 222 may be supplanted by a different center-to-center spacing provided by vertically spaced apart adapter brackets 400 mounted to each of the first and second elongated members 202, 204. Accordingly, the adapter brackets 400 increase the efficiency and capability of the cassette shelf 200 in accommodating various fiber optic cassettes having differing dimensions.

The adapter bracket 400 has first and second generally planar sections 404, 406 spaced apart from one another. According to an embodiment, the first and second planar sections 404, 406 are parallel to one another. The first and second generally planar sections 404, 406 have a maximum spacing 428 that corresponds to or is substantially close to a vertical height of the first elongated section 210 of the first and second elongated members 202, 204. The maximum spacing 428 of the first and second generally planar sections 404, 406 is dimensioned such that, when the adapter bracket 400 is secured to the one of the first and second elongated members 202, 204, the adapter bracket 400 may be moved horizontally without substantial resistance. Accordingly, the maximum spacing 428 of the first and second generally planar sections 404, 406 should not be very close to or less than the vertical height of the first elongated section 210 that the planar sections 404, 406 exert pressure on the elongated members 202, 204, resulting in friction that opposes horizontal movement of the adapter bracket 400.

The adapter bracket 400 has a third generally planar section 408 joining the first and second sections 404, 406 at ends 410, 412. As shown in the embodiment of FIG. 4, the third section 408 is substantially perpendicular to the first and second sections 404, 406. The bracket fastener perforation 402 is arranged on the third generally planar section 408. According to an embodiment, the bracket fastener perforation 402 is arranged on the third section 408 such that, when the adapter bracket is mounted to one of the first and second elongated members 202, 204, the bracket fastener perforation 402 is vertically aligned with one of the shelf fastener perforations. In other words, according to this embodiment, a vertically spaced apart and horizontally aligned pair of adapter brackets 400 secured to both of the first and second elongated members 202, 204 provides a vertical center-to-center spacing of bracket fastener perforations 402 that is identical or substantially close to the vertical center-to-center spacing 220 of the shelf fastener perforations. This arrangement allows for the efficient mounting of various fiber optic cassettes 100 having industry standard vertical center-to-center spacing 120 of fastener perforations 106, but having different widths (W). Alternatively, the bracket fastener perforation 402 may be vertically positioned on the third section 408 to provide a different vertical center-to-center spacing than the vertical center-to-center spacing 220 of the shelf fastener perforations 208.

The adapter bracket 400 has first, second and third stabilization features 418, 420, 422 and a locking feature 424 that are collectively arranged to secure the adapter bracket 400 to one of the first and second elongated members 202, 204. The first and second stabilization features 418, 420 are formed on and protrude from the first planar section 404 towards the second planar section 406. Likewise, the third stabilization feature 422 and the locking feature 424 are formed on and protrude from the second planar section 406 towards the first planar section 404.

The adapter bracket 400 is secured to one of the first and second elongated members 202, 204 when the first, second and third stabilization features 418, 420, 422 and the locking feature 424 engage with corners of the one of the first and second elongated members 202, 204 and prohibit vertical or rotational movement with respect to the first and second elongated members 202, 204. Nonetheless, the first, second and third stabilization features 418, 420, 422 and locking feature 424 do not prohibit movement in a horizontal direction with respect to the first elongated section 210. As previously explained, the first and second generally planar sections 404, 406 are spaced apart allow for relatively little friction between the adapter bracket 400 and the first and second elongated members 202, 204. The first, second and third stabilization features 418, 420, 422 and locking feature 424 are collectively arranged in a similar manner. Accordingly, when the adapter bracket 400 is secured to one of the first and second elongated members 202, 204 the bracket may be moved horizontally with respect to the first and second elongated members 202, 204 without substantial resistance.

The adapter bracket 400 may be secured to one of the first and second elongated members 202, 204 as follows. The locking feature 424 and the third stabilization feature 422 are arranged over the one of the edges 216, 218 of the first and second elongated members 202, 204 such that the third stabilization feature 422 is arranged on the same side of the first elongated section 210 as the mounting surface 206. The locking feature 424 is arranged on an opposite side of the first elongated section 210 as the mounting surface 206. Initially, the adapter bracket 400 is rotated away from one of the first and second elongated members 202, 204 such that the first and second stabilization features 418, 420 do not contact one of the first and second elongated members 202, 204. In other words, the first and second sections 404, 406 of the adapter bracket 400 are at a non-perpendicular angle with respect to the mounting surface 206. Once the locking feature 424 and the third stabilization feature 422 are arranged over the one of the edges 216, 218 as described above, the adapter bracket 400 is rotated towards the first and second elongated members 202, 204 such that the first and second sections 404, 406 of the adapter bracket 400 come closer to perpendicular with the mounting surface 206. The adapter bracket 400 is completely secured when the first and second stabilization features 418, 420 engage with corners 224, 226, as will be described in further detail below. In the secured position, the first and second sections 404, 406 of the adapter bracket 400 are substantially perpendicular to the mounting surface 206.

Alternatively, the adapter bracket 400 may be secured to one of the first and second elongated members 202, 204 as follows. First, the second stabilization feature 420 is engaged with corner 226 while the adapter bracket 400 is rotated away from the first and second elongated members 202, 204 such that the first and third stabilization features, 418, 422 and the locking feature 420 are not engaged with corners 224, 228, 230. Next, the adapter bracket 400 is rotated towards one of the first and second elongated members 202, 204 such that the first and second sections 404, 406 of the adapter bracket 400 come closer to perpendicular with the mounting surface 206. The first and third stabilization features 418, 422 and the locking feature 420 may be engaged with corners 224, 228, 230 by pulling back on an end 426 (see FIG. 4C) of the second planar section 406 so that the locking feature 424 goes over one of the ends 216, 218. In other words, the bracket 400 is rotated and flexed to snap in securely with the first elongated section 210.

FIG. 5 depicts two adapter brackets 400 secured to the first and second elongated members 202, 204. As can be seen, in the secured position, the stabilization features 418, 420, 422 and the locking feature 424 engage various corners of the first and second elongated sections 210, 212 of the first and second elongated members 202, 204. In particular, the first stabilization feature 418 engages a first corner 224 joining the first and second elongated sections 210, 212. The second stabilization feature 420 engages a second corner 226 on the second elongated section 212 that is opposite to the first corner 224. The third stabilization feature 422 engages a third corner 228 on the first elongated section 210 that is opposite to the first corner 224. The locking feature 424 engages a fourth corner 230 on the first elongated section 210 that is opposite to the third corner 228. In other words, the fourth corner 230 and the third corner 228 are separated by a thickness of the first elongated section 210.

The above described engagement of the stabilization features 418, 420, 422 and the locking feature 424 with respective corners 224, 226, 228 and 230 refers to an interfacing of the surfaces of the adapter bracket 400 with the planes that form the corners 224, 226, 228 and 230. The stabilization features 418, 420, 422 and the locking feature 424 are engaged with corners 224, 226, 228 and 230 when the stabilization and locking features 418, 420, 422 424, in conjunction with the corresponding first and second planar sections 404, 406, contact both planes that form the corners 224, 226, 228 and 230 in the immediate region of the corners 224, 226, 228 and 230. For instance, in FIG. 5, the first stabilization feature 418 is engaged with the first corner 224 because the first elongated section 210 is in contact with the first stabilization feature 418 near the first corner 224 and the second elongated section is 212 is in contact with the first planar section 404 near the first corner 224.

The locking feature 424 advantageously allows a user to secure the adapter bracket 400 to one of the first and second elongated 202, 204 members without having to position the adapter bracket 400 at an end of the first and second elongated members 202, 204 and slide the adapter bracket 400 horizontally. This is partly due to the gentle slope of the locking feature 424 with respect to the second planar section 406 that allows the adapter bracket to be pivoted so that the second and third stabilization features 418, 420 may be engaged and disengaged with the first and second corners 224, 226. The locking feature 424 also advantageously provides a substantial margin of tolerance with respect to the dimensions of first and second elongated members 202, 204. For instance, the locking feature 424 accommodates first and second elongated members 202, 204 of varying thickness because the locking feature 424 exhibits a slight spring action. In other words, thicker than normal elongated members 202, 204 may be accommodated between the locking feature 424 and the third stabilization feature by a slight flexing of the second planar section 406 that is permitted by the locking feature 424. Similarly, if the first and elongated members 202, 204 are not exactly angle-iron shaped such that the first and second elongated sections 210, 210 are not exactly perpendicular to one another, a tolerance for this variation is accommodated by the spring action of the locking feature 424.

As shown in the figures, the locking feature 424 is v-shaped with respect to the second planar section 406. This provides flexibility and allows for the spring action described above. Other shapes are possible for the locking feature 242, such as a rounded shape. The adapter bracket 400 shown in the figures has two v-shaped locking features 424 separated by an opening. Alternatively, the opening may be closed so that there is a unified v-shaped locking feature 424.

The stabilization features 418, 420, 422 and the locking feature 424 are arranged on the adapter bracket in a complementary fashion to the features of the first and second elongated members 202, 204. The first and second stabilization features 418, 420 are spaced apart on the first planar section 404 by a distance that corresponds to or is substantially close to a distance between the first and second corners 224, 226. The third stabilization feature 422 and the locking feature 424 are spaced apart on the second planar section 404 by a distance that corresponds to or is substantially close to a distance between the third and fourth corners 228, 230 of the first and second elongated members 202, 204, i.e. a thickness of the first elongated section 210. As shown, the first and second stabilization features 418, 420 are substantially perpendicular with the first planar section 404. Likewise, the third stabilization feature 422 is substantially perpendicular to the second planar section 406. This allows the stabilization features 418, 420 422 to engage with perpendicular corners 224, 226, 228 as previously discussed. Alternatively, in the case of mounting structures having non-perpendicular corners, the angles of the stabilization features 418, 420, 422 with respect to the first and second planar section 404, 406 may be correspondingly adjusted.

According to an embodiment, the third section 408 is substantially parallel to the stabilization features 418, 420, 422. This arrangement places the mounting surface 414 of the third section 408 substantially parallel to the mounting surface 206 of one of the elongated members 204, 206 when the adapter bracket is secured to one of first and second elongated members 204, 206. Consequently, the front sides 102 of fiber optic cassettes 100 mounted directly to the elongated members 204, 206 are substantially parallel to front sides 102 of fiber optic cassettes 100 that are mounted to the adapter brackets 400. The third section 408 is sufficiently spaced apart from first and third stabilization features 418, 424 to allow a part of a cassette fastener 126 and the receptacle 128 to occupy the space between the third section 408 and the mounting surface 206 when the adapter bracket 400 is secured to one of the first and second elongated members 204, 206.

The stabilization features 418, 420, 422 are sufficiently large and strong enough to restrict rotational movement of the adapter bracket 400 with respect to the first and second elongated members 202, 204. According to an embodiment, the stabilization features 418, 420, 422 are substantially rectangular. Other shapes, such as semi-circles, triangles, etc., are possible, provided that these features have a sufficient amount of surface area to engage the corners of the first and second elongated members 202, 204 in the manner described above.

Figure 6:
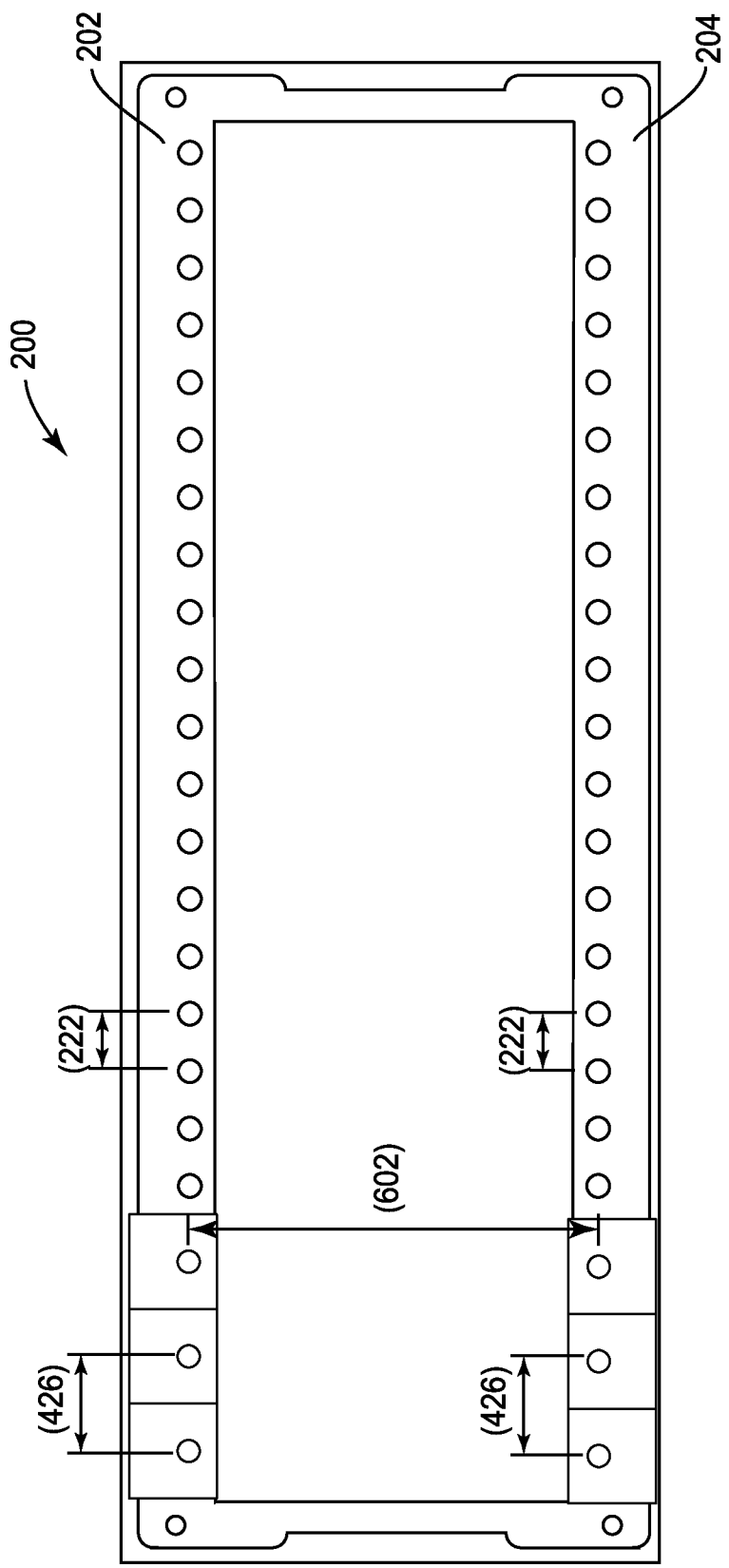
FIG. 6 depicts a front-view perspective of a plurality of adapter brackets horizontally flush with one another and secured to vertically spaced-apart elongated angle-iron shaped members of a fiber optic cassette shelf, according to an embodiment.

FIG. 6 depicts cassette shelf 200 with a plurality of adapter brackets 400 secured to both of the first and second elongated members 202, 204 on the left side of the elongated members 202, 204. The adapter brackets 400 are horizontally flush with one another. The horizontally flush adapter brackets 400 provide a horizontal center-to-center spacing 426 of the bracket fastener perforations 402 that is different than the horizontal center-to-center spacing 222 of the shelf fastener perforations 208. Vertically spaced apart pairs of adapter brackets 400 provide a vertical center-to-center spacing 602 that is substantially identical to the vertical center-to-center spacing 220 of the shelf fastener perforations 208. As previously explained, the adapter bracket 400 may be modified such that vertical center-to-center spacing 602 of vertically spaced apart pairs of bracket fastener perforations 402 that is different from the vertical center -to-center spacing 220 of the shelf fastener perforations 208.

The system depicted in FIG. 6 efficiently accommodates fiber optic cassettes 100 having varying width (W). The horizontal center-to-center spacing 222 may be tailored to a width (W) of a narrower cassette 100 and the horizontal center-to-center spacing 426 may be tailored to a width (W) of a wider cassette 100, or vice-versa. Alternatively, the horizontal center-to-center spacing 426 may be dimensioned to be narrower than the width (W) of any cassette 100 that is intended to be mounted. In that instance, the fiber optic cassettes 100 mounted to the adapter brackets 400 are horizontally flush with one another, while the adapter brackets 400 are horizontally separated.

The horizontal center-to-center spacing 426 is determined by the widest portion of the adapter bracket 400. The figures depict an adapter bracket 400 having first, second and third sections, 404, 404, 408 that are substantially identical in width. Alternatively, at least one of the first, second and third sections, 404, 404, 408 may be widened or narrowed with respect to the other sections such that only some or one of the first, second and third sections, 404, 404, 408 may be in contact when brackets are secured to elongated members 202, 204 and horizontally flush. In other words, horizontal center-to-center spacing 426.

Figure 7A:
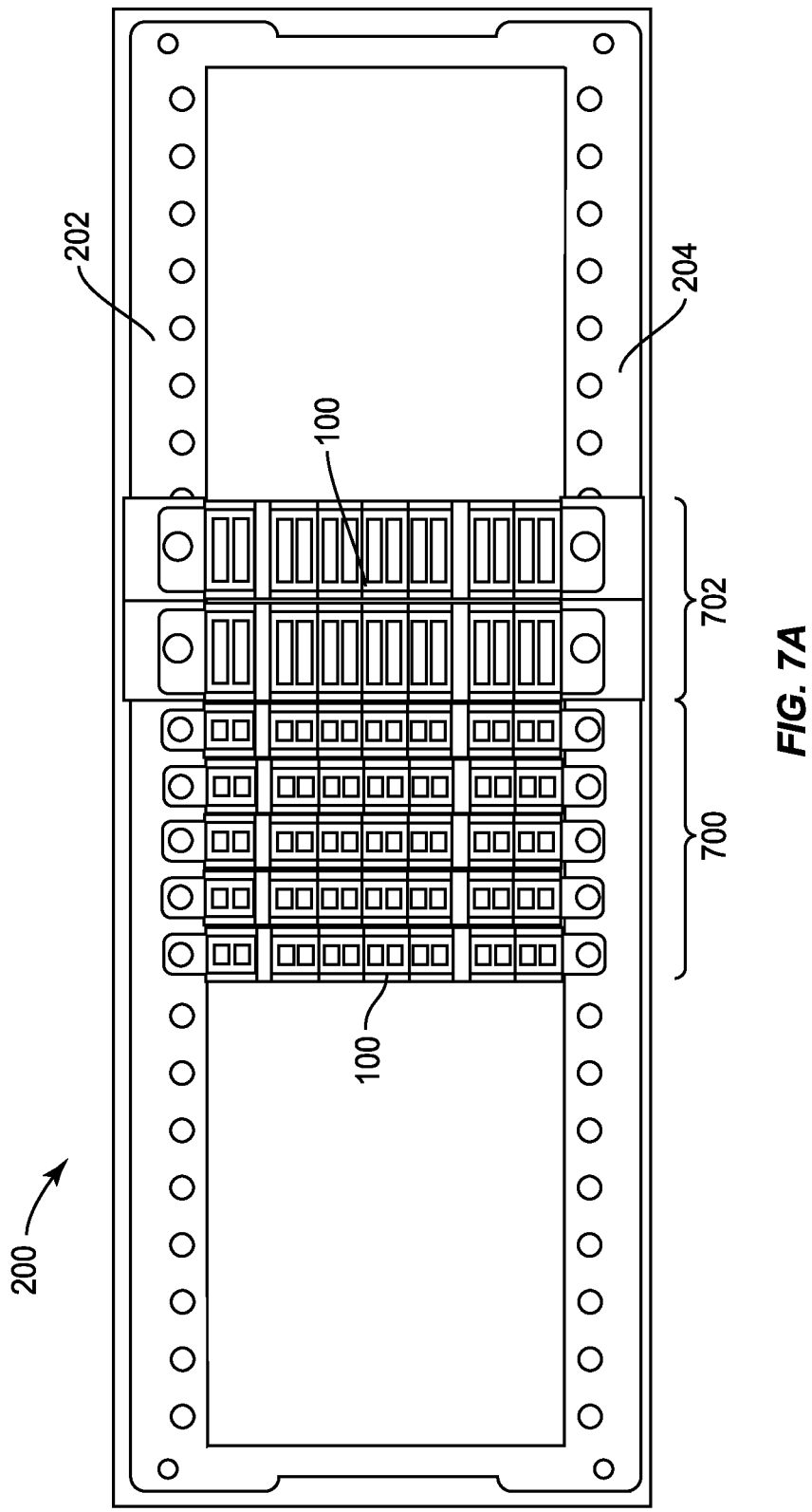
FIG. 7A depicts a front-view perspective of a fiber optic cassette shelf having a first set of fiber optic cassettes mounted directly to angle-iron shaped members of a fiber optic cassette shelf and a second set of fiber optic cassettes mounted to a plurality of adapter brackets secured to the angle-iron shaped members of a fiber optic cassette shelf, according to an embodiment.
Figure 7B:
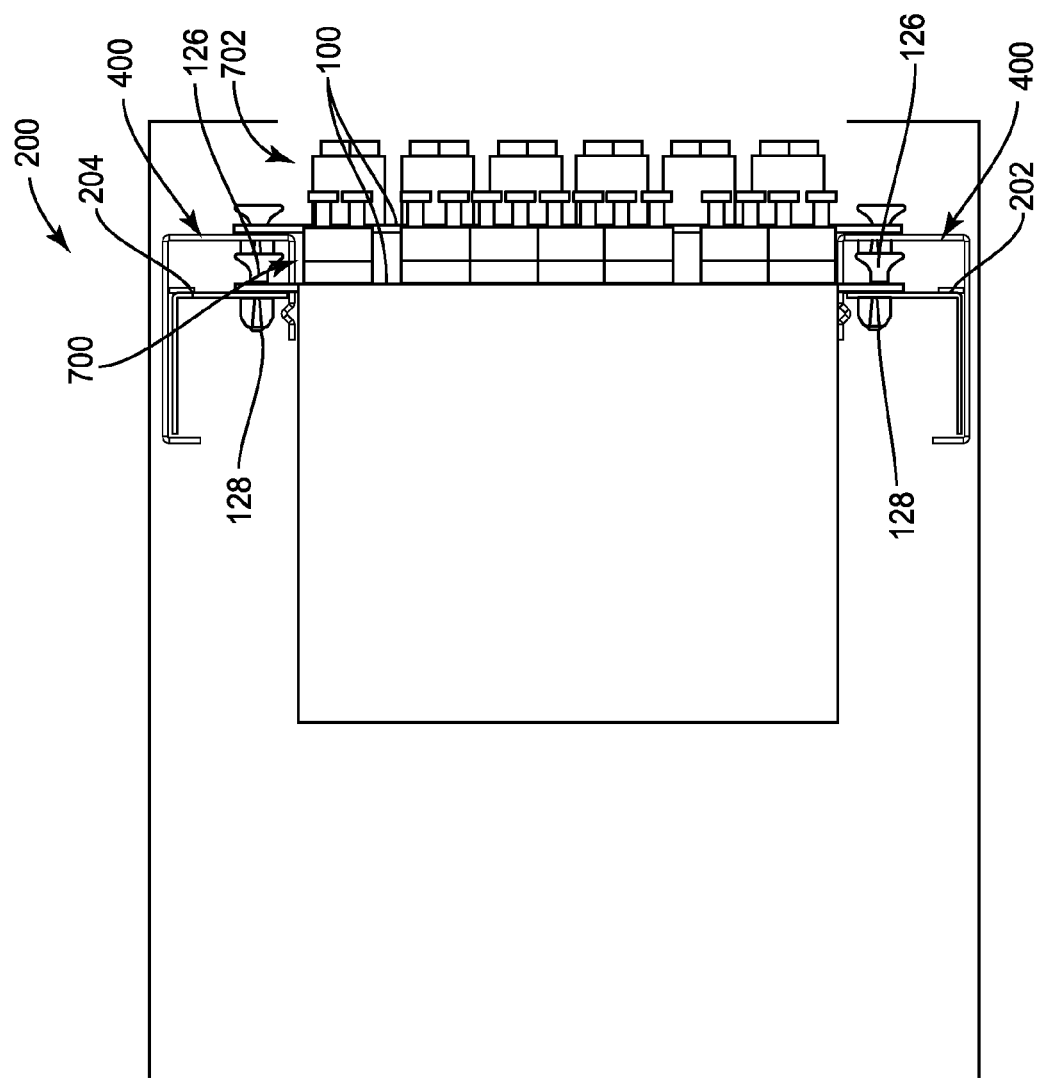
FIG. 7B depicts a diagonal-view perspective of the fiber optic cassette shelf and cassette arrangement of FIG. 7A, according to an embodiment.

FIGS. 7A and 7B depicts two sets of fiber optic cassettes 100 mounted to the fiber optic cassette shelf 200. FIG. 7A is a front-view perspective and FIG. 7B is a side-view perspective. Each of the fiber optic cassettes 100 in the first set 700 is mounted directly to the first and second elongated members 202, 204. Each of the fiber optic cassettes 100 in the second set 702 is mounted to a vertically spaced apart pair of adapter brackets 400 that is secured to the first and second elongated members 202, 204. The fiber optic cassettes 100 in the first set 700 have one vertical array of ports 104. The fiber optic cassettes 100 in the second set 702 have two vertical arrays of ports 104 and hence are wider than the fiber optic cassettes in the first set 700. As can be seen in FIG. 7A, the system including the cassette shelf 200, first and second elongated members 202, 204 and adapter brackets 400 efficiently accommodates both sets 700, 702 of fiber optic cassettes 100 having varying width with very little wasted horizontal space between the cassettes.

As shown in FIG. 7B, the fiber optic cassettes 100 in the first set 700 and the fiber optic cassettes 100 in the second set 702 are mounted such that the front sides 102 of respective fiber optic cassettes 100 are substantially parallel to one another. Front sides 102 of the fiber optic cassettes 100 in the first set 700 are spaced apart from front sides 102 of the fiber optic cassettes 100 in the second set 702. This arrangement allows installers to easily access the ports 104 and effectuate terminations with fiber optic cables.

The fiber optic cassette shelf 200 disclosed herein is an enclosure that includes features that allow for the mounting of one or more fiber optic cassettes 100. The fiber optic cassette shelf 200 at least partially surrounds the fiber optic cassettes 100 when mounted. Many different shapes and sizes are possible, depending on space requirements and the dimensions of the fiber optic cassettes 100. In addition, multiple sets of first and second elongated members 202, 204, or other mounting structures, may be disposed in a cassette shelf 200 to allow for the mounting of multiple arrays of fiber optic cassettes 100.

The term "angle-iron shaped" as used herein exclusively describes a shape and does not suggest a particular material that is necessary or preferable for the composition of first and second elongated members 202, 204. The first and second elongated members 202, 204 may be composed of any material that offers sufficient strength and durability for the mounting of fiber optic cassettes 100 as discussed herein. For instance, the first and second elongated members 202, 204 may be made of but are not limited to: steel, iron, aluminum, alloys thereof and plastic. Likewise, adapter brackets 400 may be made of but are not limited to: steel, iron, aluminum, alloys thereof and plastic.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A system for mounting a plurality of fiber optic cassettes, the system comprising:
   an enclosure dimensioned to contain the plurality of fiber optic cassettes in a horizontal array;
   first and second angle-iron-shaped elongated members affixed within the enclosure, each of the first and second elongated members comprising a first elongated section having a generally flat first mounting surface with an array of shelf fastener perforations disposed at regular intervals along the first mounting surface, each shelf fastener perforation being dimensioned to receive a cassette fastener for affixing a fiber optic cassette against the first mounting surface, and a second elongated section that is perpendicular to the first elongated section, wherein the first and second elongated members are arranged so that fiber optic cassettes may be secured to the first and second elongated members, using corresponding shelf fastener perforations; and
   a plurality of adapter brackets, wherein each of the adapter brackets comprises:
      first and second generally planar sections spaced apart from one another;
      a third section joining the first and second sections at one end of each of the first and second sections, the third section comprising a bracket fastener perforation dimensioned to receive a cassette fastener for affixing a fiber optic cassette against a first generally flat mounting surface of the third section;
      first, second and third stabilization features and a locking feature, the first and second stabilization features protruding from the first planar section, the third stabilization feature and the locking feature protruding from the second planar section, wherein the first second and third stabilization features and the locking feature are collectively arranged to secure the adapter bracket to one of the first and second elongated members and to simultaneously allow the adapter bracket to move in a horizontal direction with respect to the first elongated section without resistance,
   wherein the first and second stabilization features are spaced apart on the first planar section by a distance that corresponds to a height of the second elongated section, and wherein the third stabilization feature and the locking feature are spaced apart on the second planar section by a distance that corresponds to a thickness of the first elongated section.

2. The system of claim 1, wherein the bracket fastener perforation is arranged on the third section such that, when a pair of adapter brackets is secured to the first and second angle-iron-shaped elongated members such that the adapter brackets are vertically spaced apart and horizontally aligned with one another, a center-to-center spacing of the bracket fastener perforations substantially corresponds to a vertical center-to-center spacing of vertically spaced apart and horizontally aligned shelf fastener perforations.

3. The system of claim 1, wherein the first, second and third stabilization features are rectangular-shaped and substantially parallel to the first surface of the third section, and wherein the locking feature is v-shaped with respect to the second planar section.

4. The system of claim 1, wherein one of the adapter brackets comprises two locking features that are v-shaped with respect to the second planar section.

5. The system of claim 1, wherein the first, second and third stabilization features and the locking feature are arranged such that, when the adapter bracket is secured to one of the first and second elongated members, the first mounting surface on the third section of the adapter bracket is spaced apart from and substantially parallel to the mounting surface of the elongated member.

6. The system of claim 1, wherein a widest portion of the adapter bracket is dimensioned such that, when a plurality of adapter brackets are mounted to one of the first and second elongated members and horizontally flush with one another, a horizontal center-to-center spacing of the bracket fastener perforations is different than a horizontal center-to-center of the shelf fastener perforations.

7. The system of claim 5, wherein the widest portion of the adapter bracket is a width of the third planar section.

8. The system of claim 5, the widest portion of the adapter bracket is a width of the first planar section, the second planar section, or both.

9. The system of claim 1, wherein at least one of the adapter brackets in the plurality is secured to the one of the first and second angle-iron-shaped elongated members with the locking feature and the third stabilization feature arranged over an edge of the angle-iron-shaped elongated member and the first and second stabilization features engaged with corners of the angle-iron-shaped elongated member.

10. The system of claim 1, wherein the first stabilization feature engages with a first corner joining the first and second elongated sections together, and wherein the second stabilization feature engages a second corner on the second elongated section that is opposite to the first corner.

11. An adapter bracket for mounting a fiber optic cassette to an elongated angle-iron shaped mounting structure, the adapter bracket comprising:
first and second generally planar sections spaced apart from one another;
a third section joining the first and second sections at one end of each of the first and second sections, the third section comprising a fastener perforation dimensioned to receive a cassette fastener for affixing the fiber optic cassette against a first generally flat surface of the third section;
first, second and third stabilization features and a locking feature, the first and second stabilization features protruding from the first planar section, the third stabilization feature and the locking feature protruding from the second planar section, wherein the first second and third stabilization features and the locking feature are collectively arranged to engage corners of the elongated angle-iron shaped mounting structure, such that the adapter bracket is prohibited from rotating but allowed to move horizontally without resistance, with respect to the mounting structure,
wherein a length of the first generally planar section is greater than a length of the second generally planar section, the length of the first and second generally planar sections being measured between an end that is opposite from the third section and an end that joins with the third section.

12. The adapter bracket of claim 11, wherein the first, second and third stabilization features are rectangular-shaped and substantially parallel to the first surface of the third section, and wherein the locking feature is v-shaped with respect to the second planar section.

13. The adapter bracket of claim 11, wherein the adapter bracket comprises two locking features that are v-shaped with respect to the second planar section.

14. The adapter bracket of claim 11, wherein a widest portion of the adapter bracket is a width of the third planar section.

15. The adapter bracket of claim 11, wherein a widest portion of the adapter bracket is a width of the first planar section, the second planar section, or both.

16. The adapter bracket of claim 12, wherein the first and second stabilization features are spaced apart from one another by a first distance, wherein the third stabilization feature and the locking feature are spaced apart from one another by a second distance, and wherein the first distance is greater than the second distance.

* * * * *